H. J. LEACH.
TOY VEHICLE.
APPLICATION FILED FEB. 9, 1921.

1,395,842. Patented Nov. 1, 1921.
2 SHEETS—SHEET 1.

WITNESSES

INVENTOR
H. J. LEACH
BY
ATTORNEYS

H. J. LEACH.
TOY VEHICLE.
APPLICATION FILED FEB. 9, 1921.
1,395,842.
Patented Nov. 1, 1921.
2 SHEETS—SHEET 2.
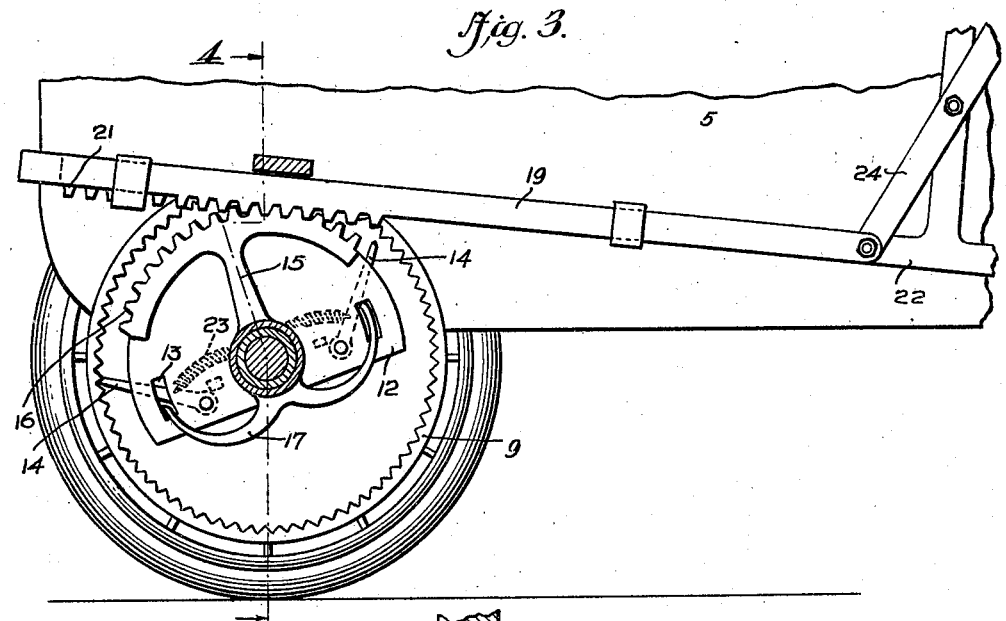
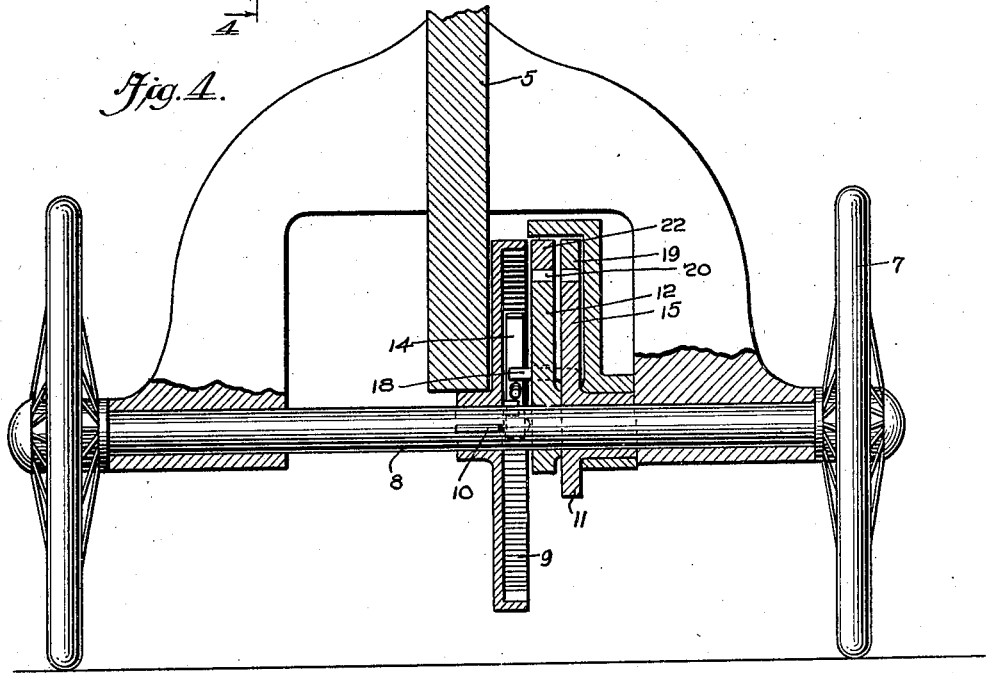
INVENTOR
H. J. LEACH

UNITED STATES PATENT OFFICE.

HORACE JOHN LEACH, OF MOUNT CARMEL, ILLINOIS.

TOY VEHICLE.

1,395,842.  Specification of Letters Patent.  Patented Nov. 1, 1921.

Application filed February 9, 1921. Serial No. 443,669.

*To all whom it may concern:*

Be it known that I, HORACE J. LEACH, a citizen of the United States, and resident of Mount Carmel, in the county of Wabash and State of Illinois, have invented a new and Improved Toy Vehicle, of which the following is a full, clear, and exact description.

It is a well appreciated fact that toys in the nature of vehicles have been placed upon the market, which toys have included a propelling means capable of being operated by a child using the vehicle. These devices have often been made in a shape conforming to the general characteristics of an automotive vehicle, and it has been found possible, by reversing the operation of the mechanism to cause the vehicle to move to the rear, as well as forward.

It is also well known that automotive vehicles include various levers for the shifting of gears, resulting in the variation of speeds, moving rearward, etc.

With the foregoing in mind, I have constructed a child's vehicle, more particularly in the nature of an automotive vehicle, but not necessarily limited to this particular shape and design, and by means of which primarily, it will be possible to operate the mechanism in a certain manner, regardless of the direction of travel of the vehicle.

A further object of my invention is the provision of a child's toy vehicle, in which the foregoing object may be accomplished by means of providing certain mechanism conforming in general characteristics, at least to the essential operating levers of an actual automotive vehicle.

Further objects of my invention will appear in the annexed specification and drawings which latter present one practical embodiment of my invention, and in which:

Fig. 3 is a partly fragmentary side view of the essential operating elements of the same, and Fig. 4 is an enlarged sectional view taken on the lines 4—4, and in the direction of the arrows in Fig. 3.

Figure 1:
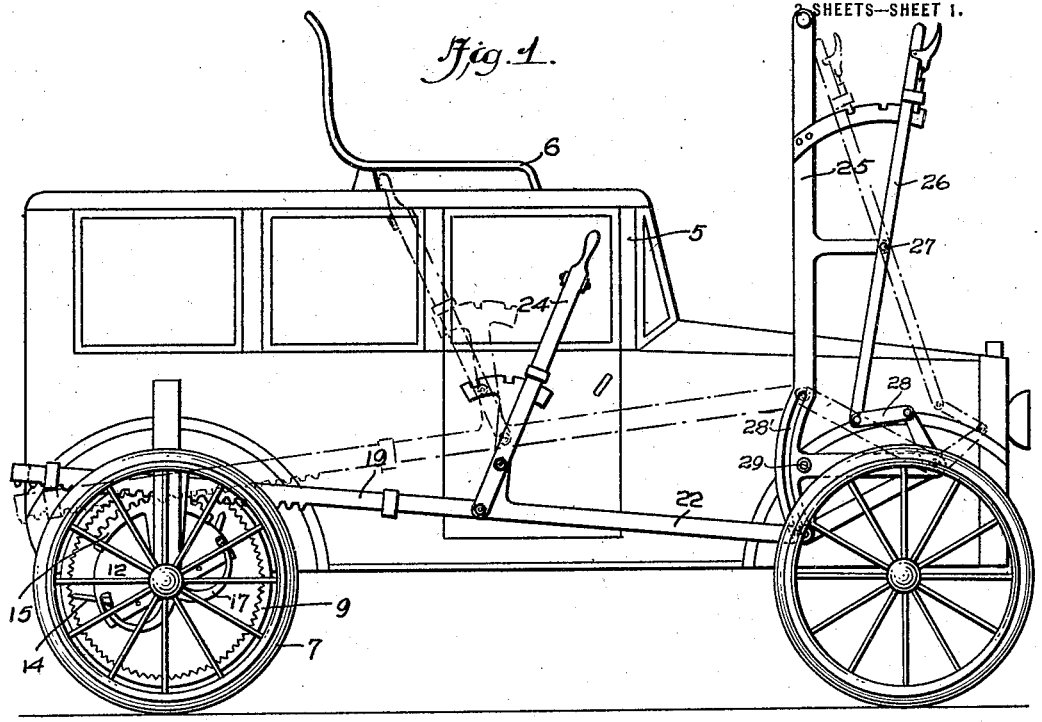
Figure 1 is a side view of a vehicle embodying my improved construction.

In these views the reference numeral 5 indicates the body of a child's vehicle which may be of any desired type. This body mounts a seat 6 for supporting the operator, and it will also be noted that wheels 7 of any desirable character are associated with the body 5 to movably support the latter.

Contrary to the conventional construction, the rear set of wheels 7 mounted upon the axles 8, are moved by means of a gear 9, presenting inwardly extending teeth, this gear being keyed as at 10, to the axle 8. Also a pair of segmental members 11 are loosely mounted upon the axle 8, and at a point adjacent the gear 9. One of these segmental members preferably includes a body 12 providing openings 13, and to the rear of each of these openings, a pawl 14 is movably secured, each of these pawls being adapted to engage with the teeth of the gear 9 in a manner hereinafter more fully described.

Further, a secondary segmental member 11 conveniently includes a body portion 15 formed with teeth 16, in its outer edge, the lower portion of the body being extended in the form of a pair of arms 17, each having free outer ends bent, as at 18, to project one through each of the openings 13, and to engage with the pawls 14.

It will be noted that teeth 16 are engaged by a serrated bar 19, and the teeth 20 of the member 12 are in turn engaged by the serrated portion 21 of a secondary bar 22 lying adjacent to the bar 19.

Thus, upon the bars 19 and 22 being reciprocated in unison, it will be appreciated that the segmental members 11 will be oscillated in unison, and by virtue of the fact that the pawl 14 engages with the teeth of the gear 9 (reference being had to Fig. 3) it will readily be understood that a rotation of this gear will be effected, resulting in a rotation of the axle 8, and wheels carried thereby.

In this connection it is to be noted that the springs 23 coöperating with each of the pawls 14 serve at all times to tend to swing these elements into intimate contact with the teeth of the gear 9. Assuming now that it is desired to reduce the motion of the vehicle without affecting the method of operation of the propelling mechanism, it will be seen that this may be accomplished by operating the lever 24 to move the bar 19 with respect to the bar 22. This will result in a rotation of the body portion 15 with respect to the body portion 12, and contact being established between one of the pawls 14, and the outer end of one of the arms 17, thus swinging the former out of contact with the teeth of the gear 9 forming the ratchet.

Also this same motion will obviously move the opposite arm 17 to permit the pawl controlled thereby to engage the teeth, subsequent to which both of the bars 19 and 22 may be synchronously reciprocated by means of the lever 25 provided for this purpose, and the mechanism will function in the same manner described in the preceding paragraphs, except for the fact that the pawl, engaging the teeth of the ratchet formed by the gear 9, will cause a rotation of the axle 8 in a direction opposite to that imparted thereto by the first named pawl.

Figure 2:
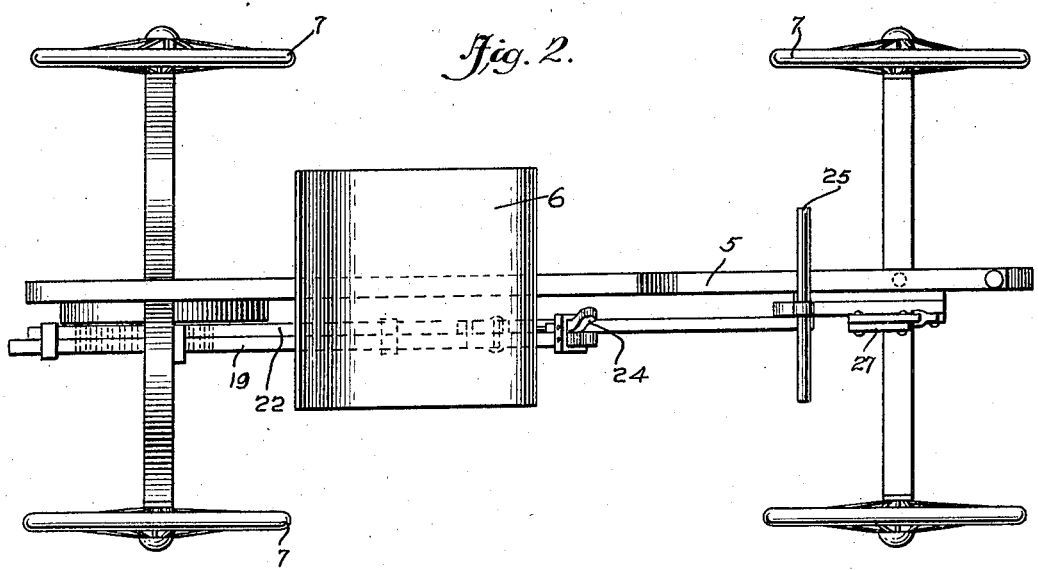
Fig. 2 is a plan view thereof.

Now with a view of providing means which will permit a pull to be exerted upon the lever 25, irrespective of the direction of rotation of the wheels 7, it will be noted, reference being had to Figs. 1 and 2, that a shift lever 26 is pivotally secured, as at 27, to the lever 25, and serves through a link connection 28 to move the end of the bar 22 through the guide slot 28′, to either the position indicated in full or dotted lines. In this connection it is to be noted that the two positions referred to are at opposite sides of the point of pivotal connection 29 of the lever 25, and thus it will be obvious that upon the lever 24 having been properly shifted, subsequent to which the lever 26 is moved to its proper position, that a pull upon the operating lever 25 will permit of either a forward or rearward motion on the part of the vehicle, according to the position of the elements.

From the foregoing it will be appreciated that I have provided a vehicle, in the nature of a toy, which will give a greater amount of pleasure to the operator, in that it will be capable of moving either forward or backward, it being necessary to accomplish this result, to shift certain of the mechanism to the movements necessary to effect the same result, in an actual automotive vehicle.

In this connection it is also to be noted that the lever 24 may be moved to a position at which the bar 19 will swing the body portion 15, and arm 17 to a point at which both of the pawls 14 will be disengaged, thus causing the parts to assume what is known as a natural position of the gear shift. Further it will be appreciated that by virtue of the construction adapted that the operator of a vehicle may coast without the necessity of operating the lever 25, as the pawl and ratchet mechanism will permit of a free rotation in one direction of the axle 10 with respect to the remaining element.

It will also be appreciated that obviously numerous modifications of structure might readily be resorted to without in the least departing from the spirit of my invention, which I claim as:

1. A toy vehicle, including an axle, an annular ratchet secured to said axle, a pair of segmental members rotatably secured to said axle, pawls carried by one of said members, means carried by the second of said members for effecting a disengagement of either of said pawls from said ratchet, said segmental members being formed with teeth, and bars also formed with a serrated portion adapted to engage said teeth.

2. A toy vehicle, including an axle, an annular ratchet secured to said axle, a pair of segmental members rotatably secured to said axle, pawls carried by one of said members, means carried by the second of said members for effecting a disengagement of either of said pawls from said ratchet, said segmental members being formed with teeth, and bars also formed with a serrated portion adapted to engage said teeth, said bars being independently movable of each other.

3. A vehicle, including an axle, an annular ratchet secured to said axle, pawls for engaging said ratchet, one of said pawls being adapted to rotate said ratchet in a clock-wise direction, the second of said pawls permitting of a rotation of the same in an anti-clockwise direction, a bar for effecting a movement of said pawls, means for reciprocating said bar, and further means for permitting of a shifting of said bar to alter its direction of thrust.

4. A vehicle, including an axle, an annular ratchet secured to said axle, pawls for engaging said ratchet, one of said pawls being adapted to rotate said ratchet in a clock-wise direction, the second of said pawls permitting of a rotation of the same in an anti-clockwise direction, a bar for effecting a movement of said pawls, means for reciprocating said bar, and means associated with said first named means for shifting the bar to alter its direction of thrust.

HORACE JOHN LEACH.